United States Patent Office 2,717,247
Patented Sept. 6, 1955

2,717,247

INTERPOLYMERS OF STYRENE, ALLYL ACETATE AND ALKYL HALF ESTERS OF MALEIC ACID AND PROCESS FOR PREPARING THE SAME

Leo L. Contois, Jr., Springfield, Mass., assignor to Monsanto Chemical Company, St. Louis, Mo., a corporation of Delaware No Drawing. Application December 21, 1953,
Serial No. 399,618

15 Claims. (Cl. 260—78.5)

This invention relates to new synthetic resins and to the process by which they are prepared. More particularly, this invention relates to new low molecular weight interpolymers and to a process for preparing the same.

An object of the present invention is the provision of new synthetic resins.

Another object is the provision of new low molecular weight interpolymers.

A further object is the provision of a process for preparing new interpolymers having a low molecular weight, as evidenced by their solubility characteristics.

These and other objects are attained by polymerizing styrene with allyl acetate and one or more alkyl half esters of maleic acid, as hereinafter defined, in mass in the presence of a catalytic amount of a water-insoluble polymerization catalyst at a temperature of about from 75 to 150° C. at a 10 to 15% per hour polymerization rate.

The following examples are given in illustration and are not intended as limitations on the scope of this invention. Where parts are mentioned, they are parts by weight.

*Example I*

Prepare the amyl half ester of maleic acid by reacting 60 parts of maleic anhydride with about 55 parts of amyl alcohol at a temperature of about 80 to 85° C. with constant agitation until the reaction mixture reaches a substantially constant acid value, as determined by titration. This normally requires about 2½ hours.

Place about 115 parts of the thus-prepared amyl half ester in a suitable closed reaction vessel fitted with suitable temperature control means and add thereto a solution of about 7.5 parts of allyl acetate, 1 part of ditertiary butyl peroxide, 0.4 part of beta-nitrostyrene and 2 parts of lauryl mercaptan in 100 parts of monomeric styrene. Sweep the reaction vessel with carbon dioxide and seal. Heat the reaction mixture to a temperature of about 100° C. in order to initiate an exothermic polymerization reaction. Regulate the reaction temperature, permitting it to slowly rise to about 135° C. over a period of about 8 hours. At the end of this time, the reaction has gone to substantial completion and a reaction product consisting essentially of a clear solid terpolymer of styrene, allyl acetate and the amyl half ester of maleic acid is obtained.

Mix about 1 part of the reaction product with 100 parts of water and slowly add a concentrated solution of ammonium hydroxide to the mixture until the reaction product is dissolved and the resultant solution has a pH of about 8. The thus prepared 1% solids solution has a viscosity of 1 to 2 cps. When this procedure is repeated, using 15 parts of terpolymer per 100 parts of water, the resultant 15% solids solution of the ammonium salt of the terpolymer has a viscosity of about 20 to 40 cps. at a pH of about 8.

When an equivalent amount of the 2-ethylhexyl half ester of maleic acid is substituted for the above-described amyl half ester and Example I is otherwise repeated in the described manner, the reaction product consists essentially of a solid terpolymer of styrene, allyl acetate and the 2-ethylhexyl half ester of maleic acid. A 1% solids aqueous ammoniacal solution of this terpolymer will have a viscosity of about 1 to 2 cps. at a pH of about 8 and a 15% solids solution will have a viscosity of 40 to 60 cps. at a pH of about 8.

When an equivalent amount of a mixture containing about 50% 2-ethylhexyl half ester and about 50% methyl half ester of maleic acid is substituted for the amyl half ester of Example I and the example is otherwise repeated in the described manner, and the reaction product consists essentially of a solid interpolymer of styrene, allyl acetate and the 2-ethylhexyl and methyl half esters of maleic acid. A 1% solids aqueous solution of the ammonium salt of this polymer will have a viscosity of about 1 to 2 cps. at a pH of about 8, and a 15% solids solution of the ammonium salt will have a viscosity of about 20 to 40 cps. at a pH of about 8.

The 2-ethylhexyl half ester of maleic acid is conveniently prepared by reacting about 80 parts of 2-ethylhexanol with about 60 parts of maleic anhydride at a temperature of about 80 to 85° C. with agitation for about three hours (i. e., until a constant acid value is obtained by titration). Similarly, when about 40 parts of 2-ethylhexanol and about 10 parts of methanol are reacted with 60 parts of maleic anhydride at a temperature of about 80 to 85° C. with agitation for about 3 hours, a mixture of about 50% 2-ethylhexyl and about 50% methyl half ester of maleic acid is formed.

It is preferable to use chain transfer agents, chain terminating agents, or mixtures thereof in order to aid in the preparation of interpolymers of low molecular weight. When the polymerization reaction is conducted in the absence of chain transfer and chain terminating agents, aqueous solutions of water-soluble salts of the resultant interpolymers will have an increased viscosity. This is illustrated by the following example.

*Example II*

Prepare a mixture of about 75% secondary butyl half ester and about 25% methyl half ester of maleic acid by reacting a mixture of about 35 parts of secondary butanol and 5 parts of methanol with about 60 parts of maleic anhydride at a temperature of about 80 to 85° C. with constant agitation. The reaction should be continued until a substantially constant acid value is obtained by titration. This normally requires about 2½ hours and at the end of this time the reaction has gone to substantial completion.

Place 100 parts of the thus-prepared mixture of half esters in a suitable closed reaction vessel fitted with suitable temperature control means. Add a solution of about 7.5 parts of allyl acetate and 1 part of ditertiary butyl peroxide in 100 parts of monomeric styrene. Sweep the vessel with carbon dioxide and seal. Heat the contents to a temperature of about 100° C. in order to initiate an exothermic polymerization reaction. Regulate the reaction temperature, permitting it to slowly rise to about 135° C. over a period of about 8 hours. At the end of this time, the reaction has gone to completion and the reaction product consists essentially of a clear solid interpolymer of styrene, allyl acetate and the secondary butyl and methyl half esters of maleic acid. A 1% solids aqueous ammoniacal solution of the ammonium salt of this interpolymer will have a viscosity of about 5 to 10 cps. at a pH of about 8. A 15% solids aqueous ammoniacal solution of the ammonium salt of the interpolymer will have a viscosity of about 160 to 180 cps. at a pH of about 8.

Repeat Example II with but one exception. Conduct the polymerization reaction between the styrene, allyl acetate and mixture of secondary butyl and methyl half esters of maleic acid in the presence of about 2 parts of lauryl mercaptan and 0.4 part of beta-nitrostyrene per 100 parts of monomeric styrene. A 1% solids aqueous ammoniacal solution of the ammonium salt of this interpolymer will have a viscosity of about 1 to 2 cps. and a 15% solids aqueous solution of the ammonium salt will have a viscosity of about 20 to 30 cps. at a pH of about 8.

The interpolymers of the present invention are prepared by polymerizing a mixture of styrene, allyl acetate and one or more alkyl half esters of maleic acid, as hereinafter defined, in mass in the presence of a catalytic amount of a water-insoluble polymerization catalyst at a temperature of about 75 to 150° C. at a 10 to 15% per hour polymerization rate. The use of diluents and solvents should be avoided if a homogeneous reaction product consisting essentially of interpolymer is to be obtained. It is preferable to conduct the reaction in an oxygen-free atmosphere. The interpolymers prepared by this process are characterized by a relatively low molecular weight as evidenced by the fact that water-soluble heteropolymer salts can be used to prepare free-flowing 15% solids aqueous solutions.

The alkyl half esters of maleic acid to be reacted with styrene and allyl acetate in accordance with the present invention are the unsubstituted and halogen-substituted saturated $C_1$ to $C_8$ alkyl half esters of maleic acid. The half esters are easily prepared by reacting maleic acid, preferably in the form of the anhydride, with an equimolar amount of a monohydric alcohol or a mixture of monohydric alcohols. Representative monohydric alcohols that can be combined with maleic acid or maleic anhydride to form the desired half esters are methanol, ethanol, 2-chloroethanol, 2-bromoethanol, propanol, isopropanol, butanol, secondary butyl alcohol, amyl alcohol, isoamyl alcohol, 2-methyl butanol, 2-chlorobutanol, 1-methyl butanol, hexanol, methylbutyl carbinol, ethylpropyl carbinol, dimethylisopropyl carbinol, heptyl alcohol, dipropyl carbinol, diisopropyl carbinol, triethyl carbinol, pentamethyl ethanol, octanol, etc. From 1 to 2 mols of styrene should be used for each mol of half ester and, for best results, it is preferable to use about 1½ mols of styrene for each mol of half ester. From about 0.075 to 0.15 mol of allyl acetate should be used for each mol of half ester in order to obtain low molecular weight interpolymers which, in the form of the water-soluble salts thereof, can be used to prepare low viscosity aqueous solutions.

A polymerization catalyst which is soluble in the monomers should be used in order to obtain the desired reaction rate. The operable catalysts are, generally speaking, the water-insoluble catalysts. Among the water-insoluble catalysts that may be used, alone or in admixture, are benzoyl peroxide, lauroyl peroxide, diethyl peroxide, acetyl peroxide, tertiary butyl peroxide, ditertiary butyl peroxide, ditertiary butyl perbenzoate, ditertiary amyl peroxide, diethyl peroxide, diazoaminobenzene, a,a'-azobisisobutyronitrile, etc. From about 0.5 to 1.5 parts of catalyst should be used for every 100 parts of styrene.

The reaction between the styrene, allyl acetate and alkyl half ester should be regulated in order to provide for a reaction rate of about 10 to 15% per hour. In other words, the reaction should be conducted within about 6 to 10 hours. Generally speaking, the reaction will be difficult to control if a shorter reaction cycle is used and incomplete conversion of the monomers will frequently result. If an excessively long polymerization cycle is used, relatively high molecular weight interpolymers will be formed. Reaction time can be regulated by suitable adjustment of the catalyst concentration, the allyl acetate concentration, the reaction temperature, etc. Generally speaking, an increase in catalyst concentration will tend to increase the reaction rate, as will an increase in temperature. The use of increased amounts of allyl acetate tends to retard reaction rate.

As has been indicated, it is preferable to use chain transfer agents, chain terminating agents or mixtures thereof in order to more effectively obtain low molecular weight products. Any of the conventional chain transfer agents or chain terminating agents may be used, numerous examples being known to those skilled in the art. Among the more effective materials of this nature are the aromatic nitro compounds of the class disclosed in U. S. Patent No. 2,537,015 to Barrett. Such compounds have the structural formula $R_1CH=C(R_2)NO_2$ wherein $R_1$ represents an aromatic radical and $R_2$ represents hydrogen or a monovalent hydrocarbon radical. Such compounds may be used in amounts varying from about 0.1 to 1 part per 100 parts of styrene. Representative of the aromatic nitro compounds that may be used are 1-phenyl-2-nitroethylene (beta-nitrostyrene), 1-vanillyl-2-nitroethylene, 1-anisyl-2-nitroethylene, 1-orthochlorophenyl-2-nitroethylene, etc. Other compounds such as $C_5$ to $C_{20}$ mercaptans may be used if desired. It is preferable to use a $C_{12}$ to $C_{15}$ mercaptan. Illustrative of the mercaptans that may be used are isohexyl mercaptan, octadecyl mercaptan, n-dodecyl mercaptan, lauryl mercaptan, tertiary dodecyl mercaptan, etc. It is usually preferable to use about 3 to 7 parts of mercaptan per 100 parts of styrene. In accordance with a preferred form of the invention, a mixture of 3 to 7 parts of lauryl mercaptan and about 0.3 to 0.5 part of beta-nitrostyrene is used for each 100 parts of styrene.

A substantially quantitative yield of interpolymer is obtained when the $C_1$ to $C_8$ alkyl half esters of the present invention are reacted with styrene and allyl acetate in accordance with the process herein disclosed. Normally, the reaction product will comprise from 95 to 99.5% interpolymer, the main contaminant being monomeric styrene. A 99% conversion is usually obtained. Moreover, the reaction products will comprise interpolymers having a comparatively narrow range of molecular weights as shown by the uniform solubility characteristics of the reaction product and by the low viscosity of interpolymer salt solutions. These factors are of importance because it is not reasonably practical to fractionate a mixture of interpolymers of widely divergent molecular weights and because it is likewise impractical to purify the interpolymer-containing reaction product. Thus, unreacted monomer, polymerization decomposition products, etc., will remain in the interpolymer as contaminants and, if present in more than a minor amount, will substantially impair the usefulness of the interpolymer.

As shown by the specific examples, the interpolymers of the present invention, in the form of the water-soluble salts thereof, can be used to prepare low-viscosity aqueous solutions. Water-soluble salts can be prepared, for example, by adding a water-soluble alkali metal, alkaline earth metal, amine, quaternary ammonium, diethyl amine, triethyl amine, etc., base to a mixture of water and interpolymer.

It is to be borne in mind that the various salts will have varying degrees of solubility. Generally speaking, the ammonium and sodium salts are the most soluble.

When the solids content of an aqueous solution of the ammonium salt of an interpolymer of the present invention is increased beyond about 15 parts of interpolymer salt per 100 parts of water, the viscosity of the solution rapidly increases as each additional part of interpolymer salt is added. An irreversible gel is usually formed at a solids content of about 20%. Aqueous solutions of interpolymer salt containing more than about 15% solids are relatively unstable and tend to gel. Accordingly, for most practical purposes, the solids content of an aqueous solution of the ammonium salt of the interpolymer should not be more than about 15%.

At room temperature, the viscosities of 15% solids aqueous solutions of ammonium salts of interpolymers of the present invention will generally vary from a low of about 25–50 cps. to a high of about 600 cps. When the polymerization reaction between styrene, allyl acetate and the alkyl half ester of maleic acid is conducted in the presence of a suitable mixture of an aromatic nitro compound and a $C_5$ to $C_{20}$ mercaptan, a 15% solids aqueous solution of the ammonium salt of the resultant interpolymer will usually have a viscosity of less than about 300 cps. at room temperature. In accordance with a preferred form of the invention, such a mixture comprises beta-nitrostyrene and a $C_{12}$ to $C_{15}$ mercaptan. When such is the case, a 15% solids aqueous solution of the ammonium salt of the resultant interpolymer will generally have a viscosity of less than about 100 cps. If the polymerization reaction is conducted in the absence of chain transfer and chain terminating agents, a 15% solids aqueous solution of the ammonium salt of the resultant interpolymer will normally have a viscosity of from about 100 to 600 cps. The average will be about 200 to 400 cps. For all practical purposes, such solutions may be considered free flowing.

The interpolymers of the present invention are also soluble in a wide variety of organic solvents such as lower aliphatic alcohols, acetone, methylethyl ketone, xylene-alcohol mixtures, etc.

The low molecular weight interpolymers of the present invention, in the form of low-viscosity aqueous solutions of the water-soluble salts thereof, are useful for a wide variety of purposes. When a small amount of such a solution is incorporated into a conventional latex, such as a styrene-butadiene copolymer latex, the resultant composition has appreciably improved storage stability as compared to the unmodified latex. Emulsion wax formulations containing a small amount of an aqueous solution of a salt of an interpolymer of the present invention can be used to form strong and durable coatings. High solids-low viscosity solutions of interpolymer salt can be used to form strong and durable films by film-casting processes. The interpolymers can be used to prepare textile-treating agents, tanning agents, coating compositions, etc.

Aqueous interpolymer salt solutions tend to increase in viscosity as the pH of the solution is increased. Moreover, highly alkaline solutions of ammonium salts of the heteropolymers will frequently have an undesirable odor. Accordingly, for most purposes, it is preferable that the aqueous solution of interpolymer salt have a pH of about 8; this being particularly desirable when the interpolymer salt is the ammonium salt.

What is claimed is:

1. A process for preparing a low molecular weight interpolymer which comprises reacting a half ester taken from the group consisting of unsubstituted and halogen-substituted saturated $C_1$ to $C_8$ alkyl half esters with from 1 to 2 mols of styrene and 0.075 to 0.150 mol of allyl acetate per mol of half ester in the presence of from 0.5 to 1.5 parts of polymerization catalyst per 100 parts of styrene at a temperature of from 75 to 150° C. at a 10–15% per hour polymerization rate.

2. A process as in claim 1 wherein the polymerization reaction is conducted in the presence of from 0.1 to 1 part of an aromatic nitro compound and from 3 to 7 parts of a $C_5$ to $C_{20}$ mercaptan per 100 parts of styrene.

3. A process as in claim 2 wherein the aromatic nitro compound is beta-nitrostyrene and the mercaptan is lauryl mercaptan.

4. A process for preparing a low molecular weight interpolymer which comprises copolymerizing a half ester taken from the group consisting of unsubstituted and halogen-substituted saturated $C_1$ to $C_8$ alkyl half esters of maleic acid with about 1.5 mols of styrene and about 0.1 mol of allyl acetate per mol of half ester, in mass in the presence of about 0.4 part of beta-nitrostyrene and about 2 parts of lauryl mercaptan per 100 parts of styrene at a temperature of from 75 to 150° C. at about a 12½% per hour polymerization rate.

5. A process as in claim 4 wherein the half ester comprises the amyl half ester of maleic acid.

6. A process as in claim 4 wherein the half ester comprises the 2-ethylhexyl half ester of maleic acid.

7. A process as in claim 4 wherein the half ester comprises a mixture of the secondary butyl half ester and the methyl half ester of maleic acid.

8. A process as in claim 4 wherein the half ester comprises a mixture of the 2-ethylhexyl half ester and the methyl half ester of maleic acid.

9. A low molecular weight interpolymer of styrene, allyl acetate and a member of the group consisting of unsubstituted and halogen-substituted saturated $C_1$ to $C_8$ alkyl half esters of maleic acid and mixtures thereof, a 15% solids aqueous ammoniacal solution of the ammonium salt of said interpolymer at normal temperatures having a viscosity of less than 600 centipoises, said interpolymer consisting of 1–2 mols of styrene and 0.075–0.15 mol of allyl acetate per mol of alkyl half ester.

10. An interpolymer as in claim 9 wherein the alkyl half ester is the amyl half ester of maleic acid.

11. An interpolymer as in claim 9 wherein the alkyl half ester is the 2-ethylhexyl half ester of maleic acid.

12. An interpolymer as in claim 9 wherein a mixture of alkyl half esters is used.

13. An interpolymer as in claim 12 wherein the mixture consists of the secondary butyl and the methyl half esters of maleic acid.

14. An interpolymer as in claim 12 wherein the mixture consists of the 2-ethylhexyl and methyl half esters of maleic acid.

15. A process for preparing a low molecular weight interpolymer which comprises reacting from 1 to 2 mols of styrene and from 0.075 to 0.15 mol of allyl acetate with 1 mol of a member of the group consisting of unsubstituted and halogen-substituted saturated $C_1$ to $C_8$ alkyl half esters of maleic acid and mixtures thereof, in the presence of a catalytic amount of a water-insoluble polymerization catalyst in mass at a temperature of from 75 to 150° C. at a 10 to 15% per hour polymerization rate.

References Cited in the file of this patent

UNITED STATES PATENTS

| | | |
|---|---|---|
| 2,615,864 | Grammaria | Oct. 28, 1952 |
| 2,640,819 | Barrett | June 2, 1953 |
| 2,658,057 | Park | Nov. 3, 1953 |

FOREIGN PATENTS

| | | |
|---|---|---|
| 663,841 | Great Britain | Dec. 27, 1951 |